United States Patent
Shimoda et al.

(10) Patent No.: US 11,221,067 B2
(45) Date of Patent: Jan. 11, 2022

(54) CONTROL APPARATUS FOR VEHICLE

(71) Applicant: TOYOTA JIDOSHA KABUSHIKI KAISHA, Toyota (JP)

(72) Inventors: Masato Shimoda, Toyota (JP); Naoto Moriya, Toyota (JP); Masakazu Owatari, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/130,703

(22) Filed: Dec. 22, 2020

(65) Prior Publication Data

US 2021/0270362 A1    Sep. 2, 2021

(30) Foreign Application Priority Data

Feb. 28, 2020 (JP) .............................. JP2020-033265

(51) Int. Cl.
*F16H 59/70* (2006.01)
*F16H 59/44* (2006.01)
(Continued)

(52) U.S. Cl.
CPC ............. *F16H 59/70* (2013.01); *F16H 59/18* (2013.01); *F16H 59/40* (2013.01); *F16H 59/42* (2013.01);
(Continued)

(58) Field of Classification Search
CPC .......... F16H 59/18; F16H 59/40; F16H 59/42; F16H 59/44; F16H 59/70; F16H 2059/147; F16H 2059/6815; F16H 2059/706; F16H 61/0213; F16H 2061/0087; F16H 2061/0216; B60W 10/06; B60W 10/11; B60W 30/186; B60W 30/19

See application file for complete search history.

(56) References Cited

U.S. PATENT DOCUMENTS 4,766,973 A * 8/1988 Kashihara .......... B60K 23/0808
                                                180/249
6,454,676 B1 * 9/2002 Date ..................... B60W 10/06
                                                477/120
(Continued)

FOREIGN PATENT DOCUMENTS

JP          2007-186098 A       7/2007

*Primary Examiner* — Edwin A Young
(74) *Attorney, Agent, or Firm* — Oblon, McClelland, Maier & Neustadt, L.L.P.

(57) ABSTRACT

A control apparatus includes an input torque acquisition unit acquiring an input torque input to an automatic transmission input shaft, a clutch torque acquisition unit acquiring a clutch torque of a clutch operated to change a gear stage of the transmission, a torque determination unit determining a change of the input torque and the clutch torque from a first state in which one of the input torque and the clutch torque is greater than the other to a second state in which the other one is greater than the one, a gear ratio calculation unit calculating an intermediate gear ratio between pre-shift and post-shift gear ratios, and a torque calculation unit, when the torque determination unit determines a change of the input torque and the clutch torque from the first state to the second state, executing a process of calculating a target engine torque based on the intermediate gear ratio.

6 Claims, 5 Drawing Sheets

(51) Int. Cl.
*F16H 59/42* (2006.01)
*F16H 59/40* (2006.01)
*F16H 59/18* (2006.01)
*F16H 61/02* (2006.01)
F16H 59/14 (2006.01)
F16H 59/68 (2006.01)
F16H 61/00 (2006.01)

(52) U.S. Cl.
CPC ......... *F16H 59/44* (2013.01); *F16H 61/0213* (2013.01); *F16H 2059/147* (2013.01); *F16H 2059/6815* (2013.01); *F16H 2059/706* (2013.01); *F16H 2061/0087* (2013.01); *F16H 2061/0216* (2013.01)

(56) References Cited

U.S. PATENT DOCUMENTS

| | | |
|---|---|---|
| 2007/0191184 A1 | 8/2007 | Kuwahara et al. |
| 2017/0211638 A1* | 7/2017 | Miyazono ............... F16D 48/06 |

* cited by examiner

CONTROL APPARATUS FOR VEHICLE

CROSS-REFERENCE TO RELATED APPLICATION

This application claims priority to Japanese Patent Application No. 2020-033265 filed on Feb. 28, 2020, incorporated herein by reference in its entirety.

BACKGROUND

1. Technical Field

The present disclosure relates to a control apparatus for a vehicle.

2. Description of Related Art

A vehicle described in Japanese Unexamined Patent Application Publication No. 2007-186098 (JP 2007-186098 A) includes a step automatic transmission. The vehicle includes an input rotation speed sensor and an output rotation speed sensor. The input rotation speed sensor detects the rotation speed of an input shaft of the automatic transmission. The output rotation speed sensor detects the rotation speed of an output shaft of the automatic transmission. The input rotation speed sensor is located near a gear provided on the input shaft. The input rotation speed sensor detects the rotation speed of the input shaft by detecting the number of teeth of the gear, which pass near the input rotation speed sensor per unit time. The output rotation speed sensor is located near a gear provided on the output shaft. The output rotation speed sensor detects the rotation speed of the output shaft by detecting the number of teeth of the gear, which pass near the output rotation speed sensor per unit time.

The vehicle includes a control apparatus that controls the vehicle. The control apparatus of the vehicle calculates a target driving force based on a speed of the vehicle and an accelerator operation amount of an accelerator pedal operated by a driver. The control apparatus of the vehicle calculates a target engine torque of an engine based on the target driving force and a gear ratio of the automatic transmission.

Here, the gear ratio of the automatic transmission, which is determined from a gear stage before change, is referred to as pre-shift gear ratio, the gear ratio of the automatic transmission, which is determined from a gear stage after change, is referred to as post-shift gear ratio, and the gear ratio between the pre-shift gear ratio and the post-shift gear ratio is referred to as intermediate gear ratio. The control apparatus of the vehicle, in shifting the automatic transmission, determines the timing at which the gear ratio of the automatic transmission changes from the pre-shift gear ratio to the intermediate gear ratio, that is, the start timing of an inertia phase. The gear ratio of the automatic transmission is acquired based on the rotation speed of the input shaft, detected by the input rotation speed sensor, and the rotation speed of the output shaft, detected by the output rotation speed sensor. The control apparatus of the vehicle calculates a target engine torque based on the pre-shift gear ratio before the start of the inertia phase and calculates a target engine torque based on the intermediate gear ratio after the start of the inertia phase.

SUMMARY

The rotation speeds of the input shaft and output shaft of the automatic transmission decrease as the speed of the vehicle decreases. When the rotation speed of the input shaft of the automatic transmission is low, the number of teeth of the gear, which pass near the input rotation speed sensor per unit time, is less than that when the rotation speed is high. When the rotation speed of the output shaft of the automatic transmission is low, the number of teeth of the gear, which pass near the output rotation speed sensor per unit time, is less than that when the rotation speed is high. As a result, the rotation speed of the input shaft, detected by the input rotation speed sensor, tends to deviate from an actual rotation speed of the input shaft, and the rotation speed of the output shaft, detected by the output rotation speed sensor, tends to deviate from an actual rotation speed of the output shaft. In this case, the control apparatus of the vehicle may determine the start of the inertia phase although before the start of the inertia phase or may not determine the start of the inertia phase after the start of the inertia phase. As a result, there are concerns that the accuracy of calculating a target engine torque decreases due to the situation in which the start timing of the inertia phase is not appropriately determined.

A control apparatus that is applied to a vehicle including an engine and a step automatic transmission includes an input torque acquisition unit configured to acquire an input torque to be input to an input shaft of the automatic transmission, a clutch torque acquisition unit configured to acquire a clutch torque that is a maximum transmissive torque of a clutch to be operated when a gear stage of the automatic transmission is changed, a torque determination unit configured to, where a state in which one of the input torque and the clutch torque is greater than the other one of the input torque and the clutch torque is a first state and a state in which the other one of the input torque and the clutch torque is greater than the one of the input torque and the clutch torque is a second state, determine a change of the input torque and the clutch torque from the first state to the second state, a gear ratio calculation unit configured to calculate an intermediate gear ratio that is a gear ratio between a pre-shift gear ratio and a post-shift gear ratio, the pre-shift gear ratio being a gear ratio of the automatic transmission, which is determined from a gear stage before change, a post-shift gear ratio being a gear ratio of the automatic transmission, which is determined from a gear stage after change, and a torque calculation unit configured to, on condition that the torque determination unit determines a change of the input torque and the clutch torque from the first state to the second state, execute a torque calculation process that is a process of calculating a target engine torque of the engine based on the intermediate gear ratio calculated by the gear ratio calculation unit.

The timing of a change from the gear ratio of a gear stage before change to the intermediate gear ratio, that is, the start timing of an inertia phase, substantially coincides with the timing of a change of the input torque and the clutch torque from the first state to the second state. Here, even when a speed of the vehicle decreases, the accuracy of acquiring the input torque and the clutch torque is less likely to decrease as compared to the accuracy of the rotation speeds of the input shaft and output shaft of the automatic transmission, which are detected by the rotation speed sensors. Therefore, with the above configuration, the start timing of the inertia phase is determined based on a change of the input torque and the clutch torque from the first state to the second state, so the determination accuracy is less likely to decrease even when the speed of the vehicle is low. As a result, it is possible to suppress a decrease in the accuracy of calculating a target engine torque due to the situation in which the start timing of the inertia phase is not appropriately determined.

In the above configuration, the torque calculation unit may be configured to execute the torque calculation process on condition that a speed of the vehicle is lower than a predetermined vehicle speed threshold and the torque determination unit determines a change of the input torque and the clutch torque from the first state to the second state.

The accuracy of detecting the rotation speeds of the input shaft and output shaft of the automatic transmission with the rotation speed sensors tends to decrease when the speed of the vehicle is lower than the vehicle speed threshold as compared to when the speed of the vehicle is higher than or equal to the vehicle speed threshold. Therefore, with the above configuration, even when the accuracy of detecting the rotation speeds with the rotation speed sensors tends to decrease, it is possible to appropriately determine the start timing of the inertia phase.

In the above configuration, the vehicle may further include an input rotation speed sensor configured to detect a rotation speed of the input shaft, and an output rotation speed sensor configured to detect a rotation speed of an output shaft of the automatic transmission, the control apparatus may further include a gear ratio acquisition unit configured to acquire a gear ratio of the automatic transmission based on the rotation speed of the input shaft, detected by the input rotation speed sensor, and the rotation speed of the output shaft, detected by the output rotation speed sensor, and a gear ratio determination unit configured to determine a change of the gear ratio of the automatic transmission, acquired by the gear ratio acquisition unit, from the pre-shift gear ratio to the intermediate gear ratio, and the torque calculation unit may be configured to execute the torque calculation process on condition that the speed of the vehicle is higher than or equal to the vehicle speed threshold and the gear ratio determination unit determines a change of the gear ratio of the automatic transmission, acquired by the gear ratio acquisition unit, from the pre-shift gear ratio to the intermediate gear ratio.

With the above configuration, when the speed of the vehicle is higher than or equal to the vehicle speed threshold, that is, when the accuracy of detecting the rotation speed of the input shaft or the rotation speed of the output shaft is less likely to decrease, it is possible to highly accurately determine the start timing of the inertia phase based on a gear ratio obtained from the rotation speed of the input shaft and the rotation speed of the output shaft.

The clutch torque acquisition unit may be configured to, when the speed of the vehicle is higher than or equal to a predetermined learning threshold and the gear ratio determination unit determines a change of the gear ratio of the automatic transmission, acquired by the gear ratio acquisition unit, from the pre-shift gear ratio to the intermediate gear ratio, execute a learning process that is a process of updating the clutch torque such that a difference between the clutch torque and the input torque acquired by the input torque acquisition unit reduces.

Depending on a manufacturing error or the like of the automatic transmission, there may occur a deviation between an actual start timing of the inertia phase and the determined start timing of the inertia phase based on a change of the input torque and the clutch torque from the first state to the second state. Here, at the actual start timing of the inertia phase, the input torque and an actual clutch torque substantially coincide with each other. With the above configuration, it is possible to suppress occurrence of a deviation between the actual start timing of the inertia phase and the determined timing of a change of the input torque and the clutch torque from the first state to the second state.

In the above configuration, the torque calculation unit may be configured to execute the torque calculation process by using the clutch torque on condition that the speed of the vehicle is lower than a predetermined vehicle speed threshold, the torque determination unit determines a change of the input torque and the clutch torque from the first state to the second state, and the learning process has been executed.

With the above configuration, occurrence of a deviation between the actual start timing of the inertia phase and the determined timing of a change of the input torque and the clutch torque from the first state to the second state is suppressed. Therefore, it is possible to appropriately calculate a target engine torque for a change from the pre-shift gear ratio to the intermediate gear ratio.

In the above configuration, the first state may be a state in which the clutch torque is greater than the input torque, the second state may be a state in which the clutch torque is less than the input torque, and the torque calculation unit may be configured to, when an accelerator member of the vehicle is being operated and the post-shift gear ratio is higher than the pre-shift gear ratio, execute the torque calculation process on condition that there occurs a deviation greater than or equal to a predetermined value between the input torque and the clutch torque after the torque determination unit determines a change of the input torque and the clutch torque from the first state to the second state.

When the accelerator member of the vehicle is being operated and the post-shift gear ratio is higher than the pre-shift gear ratio, it is highly likely that acceleration of the vehicle is required. Here, when it is assumed that a target driving force of the vehicle is maintained at a constant value, after a change of the gear ratio from the pre-shift gear ratio to the intermediate gear ratio, the target engine torque reduces with an increase in gear ratio as compared to before a change of the gear ratio. If the start of the inertia phase is determined although before the start of the inertia phase, the target engine torque reduces when the gear ratio is the pre-shift gear ratio. Then, an actual driving force of the vehicle becomes smaller than the target driving force, so the acceleration performance of the vehicle deteriorates. With the above configuration, the situation in which a target engine torque is calculated based on the intermediate gear ratio although before the start of the inertia phase is less likely to occur. As a result, it is possible to suppress deterioration of the acceleration performance of the vehicle when acceleration of the vehicle is required.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Hereinafter, an embodiment will be described with reference to FIG. 1 to FIG. 4. First, the schematic configuration of a vehicle 100 will be described.

Figure 1:
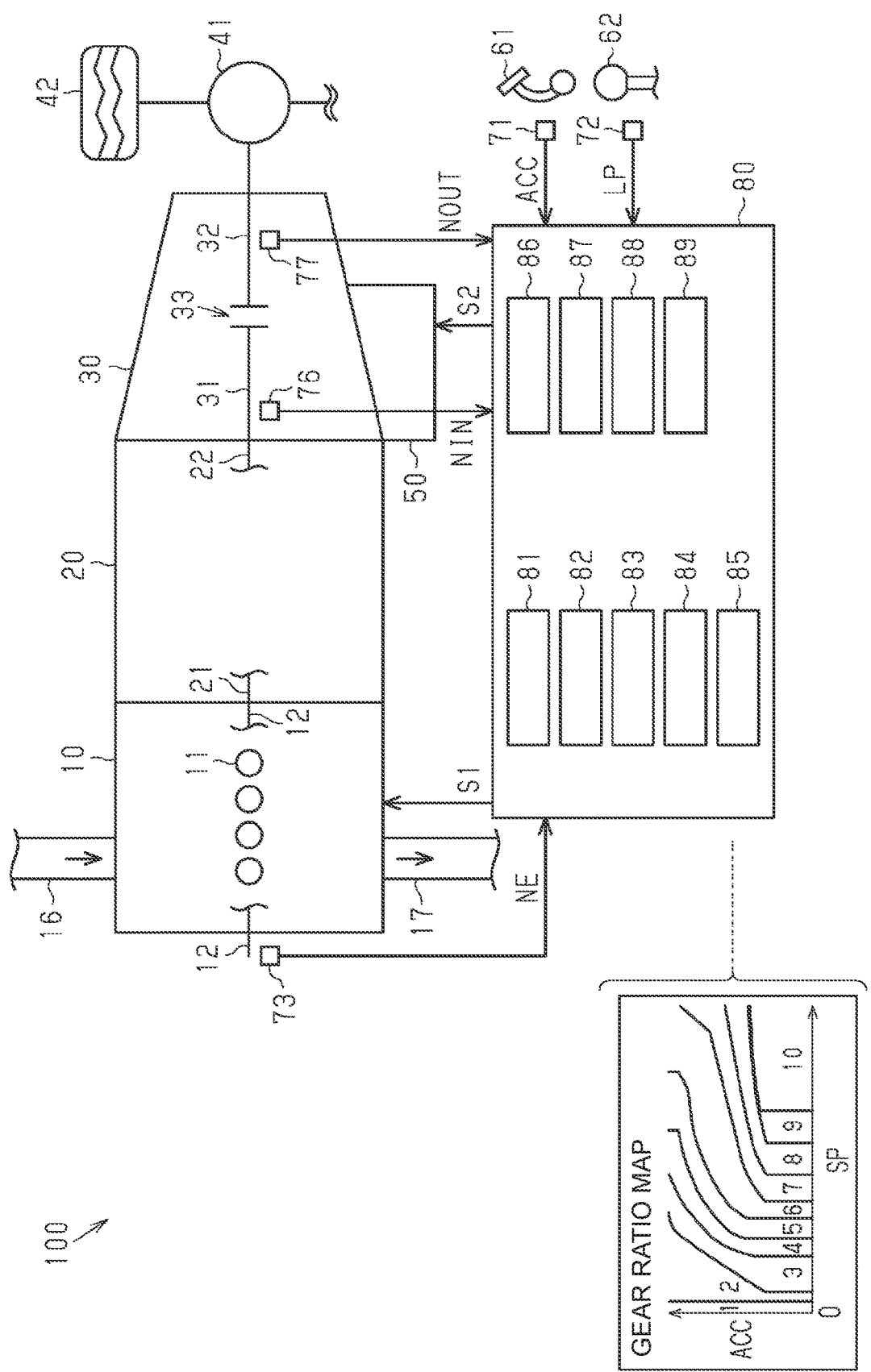
FIG. 1 is a schematic diagram of a vehicle according to a first embodiment.

As shown in FIG. 1, the vehicle 100 includes an engine 10, an intake passage 16, an exhaust passage 17, a torque converter 20, an automatic transmission 30, a differential gear 41, drive wheels 42, and a hydraulic mechanism 50.

The engine 10 includes four cylinders 11 and a single crankshaft 12. The intake passage 16 is connected to the engine 10. The intake passage 16 introduces intake air outside the vehicle 100 into the cylinders 11. The exhaust passage 17 is connected to the engine 10. The exhaust passage 17 emits exhaust gas from the cylinders 11.

The torque converter 20 is fixed to the engine 10. The torque converter 20 includes an input shaft 21 and an output shaft 22. One end of the input shaft 21 is connected to the crankshaft 12. The other end of the input shaft 21 is coupled to the output shaft 22 via a lockup clutch (not shown).

The automatic transmission 30 is fixed to the torque converter 20. The automatic transmission 30 is a step automatic transmission including a plurality of planetary gear trains. The automatic transmission 30 includes an input shaft 31, an output shaft 32, and a plurality of clutches 33. FIG. 1 shows only one of the clutches 33.

One end of the input shaft 31 is connected to the output shaft 22. The other end of the input shaft 31 is connected to one end of the output shaft 32 via the clutches 33. The other end of the output shaft 32 is connected to the right and left drive wheels 42 of the vehicle 100 via the differential gear 41. Each clutch 33 is enabled to switch between an engaged state and a released state by a hydraulic pressure supplied to the clutch 33. Specifically, when a hydraulic pressure supplied to the clutch 33 increases, the clutch 33 is switched from the released state to the engaged state. A maximum transmissive torque of the clutch 33 increases as a hydraulic pressure supplied to the clutch 33 increases. A gear stage of the automatic transmission 30 is changed by changing the clutch to be engaged and the clutch to be released among the clutches 33. When the gear stage of the automatic transmission 30 is changed, the gear ratio of the automatic transmission 30 is changed. The automatic transmission 30 also includes a plurality of brakes (not shown) as frictional engagement elements that are enabled to switch between an engaged state and a released state.

The hydraulic mechanism 50 filled with hydraulic fluid is connected to the automatic transmission 30. The hydraulic mechanism 50 operates the engaged and released states of the clutches 33 by controlling hydraulic fluid supplied to the clutches 33.

The vehicle 100 includes an accelerator pedal 61 for a driver to operate acceleration or deceleration of the vehicle 100. In the present embodiment, the accelerator pedal 61 may be regarded as an accelerator member. The vehicle 100 includes a shift lever 62 for the driver to change the drive mode of the vehicle 100. The shift lever 62 is operated by the driver to shift into a non-drive position or a drive position. Here, the non-drive position is a position at which the vehicle 100 does not run and is, for example, a parking position or a neutral position. When the shift lever 62 is at the non-drive position, a non-driving gear stage is established in the automatic transmission 30. The drive position is a position at which the vehicle 100 runs and is, for example, a forward drive position or a reverse drive position. When the shift lever 62 is at the drive position, a driving gear stage is established in the automatic transmission 30.

In the present embodiment, when the shift lever 62 is at the forward drive position, 10 gear stages, that is, first gear, second gear, third gear, fourth gear, fifth gear, sixth gear, seventh gear, eighth gear, ninth gear, and tenth gear, are enabled to be established in the automatic transmission 30. When the gear stage of the automatic transmission 30 is changed, the gear ratio of the automatic transmission 30 is set to a predetermined gear ratio in accordance with the changed gear stage. The gear ratio of the automatic transmission 30 is a ratio indicating the number of revolutions the input shaft 31 makes while the output shaft 32 makes one revolution. The gear ratio of the automatic transmission 30 reduces as the gear stage increases.

The vehicle 100 includes an accelerator operation amount sensor 71, a lever position sensor 72, a crank rotation speed sensor 73, an input rotation speed sensor 76, and an output rotation speed sensor 77.

The accelerator operation amount sensor 71 is attached near the accelerator pedal 61. The accelerator operation amount sensor 71 detects an accelerator operation amount ACC that is an operation amount of the accelerator pedal 61 operated by the driver. The lever position sensor 72 is attached near the shift lever 62. The lever position sensor 72 detects a lever position LP that is an operating position of the shift lever 62 operated by the driver. The crank rotation speed sensor 73 is attached near the crankshaft 12. The crank rotation speed sensor 73 detects an engine rotation speed NE that is a rotation speed of the crankshaft 12.

The input rotation speed sensor 76 is attached near the input shaft 31. The input rotation speed sensor 76 detects an input rotation speed NIN that is a rotation speed of the input shaft 31. The output rotation speed sensor 77 is attached near the output shaft 32. The output rotation speed sensor 77 detects an output rotation speed NOUT that is a rotation speed of the output shaft 32.

The vehicle 100 includes a control apparatus 80. A signal indicating an accelerator operation amount ACC is input from the accelerator operation amount sensor 71 to the control apparatus 80. A signal indicating a lever position LP is input from the lever position sensor 72 to the control apparatus 80. A signal indicating an engine rotation speed NE is input from the crank rotation speed sensor 73 to the control apparatus 80. A signal indicating an input rotation speed NIN is input from the input rotation speed sensor 76 to the control apparatus 80. A signal indicating an output rotation speed NOUT is input from the output rotation speed sensor 77 to the control apparatus 80. The control apparatus 80 calculates a vehicle speed SP that is a speed of the vehicle 100 based on the output rotation speed NOUT and a reduction ratio from the output shaft 32 to the drive wheels 42.

The control apparatus 80 includes a driving force calculation unit 81. The driving force calculation unit 81 calculates a target driving force A that is a target value of a driving force for driving the vehicle 100. The driving force calculation unit 81 calculates a target driving force A based on an accelerator operation amount ACC and a vehicle speed SP. A target driving force A calculated by the driving force calculation unit 81 increases as the accelerator operation amount ACC increases. A target driving force A calculated by the driving force calculation unit 81 increases as the vehicle speed SP increases.

The control apparatus 80 includes a torque calculation unit 82. The torque calculation unit 82 calculates a target engine torque B that is a target value of an engine torque for rotating the crankshaft 12 of the engine 10. The torque calculation unit 82 calculates a target engine torque B based on a target driving force A and a gear ratio of the automatic transmission 30. A target engine torque B calculated by the torque calculation unit 82 increases as the target driving force A increases. A target engine torque B calculated by the torque calculation unit 82 increases as the gear ratio of the automatic transmission 30 reduces.

The control apparatus 80 includes a control unit 83. The control unit 83 controls the engine 10 and the automatic transmission 30. Specifically, the control unit 83 outputs a control signal S1 to the engine 10 based on a target engine torque B. The engine 10 is controlled in accordance with the control signal S1. The control unit 83 selects the gear stage of the automatic transmission 30 based on an accelerator operation amount ACC and a vehicle speed SP. A gear ratio map is prestored in the control unit 83. The gear ratio map shows a gear stage to be set by the automatic transmission 30 in association with an accelerator operation amount ACC and a vehicle speed SP. As shown in FIG. 1, in the gear ratio map, at the same accelerator operation amount ACC, a higher gear stage is selected as the vehicle speed SP increases. At the same vehicle speed SP, a lower gear stage is selected as the accelerator operation amount ACC increases. The control unit 83 outputs a control signal S2 to the hydraulic mechanism 50 in accordance with the selected gear stage of the automatic transmission 30. The control unit 83 changes the gear stage of the automatic transmission 30 by operating the engaged and released states of the clutches 33 through the hydraulic mechanism 50.

The control apparatus 80 includes a gear ratio calculation unit 84 and a gear ratio acquisition unit 85. The gear ratio calculation unit 84 acquires an input rotation speed NIN detected by the input rotation speed sensor 76 and an output rotation speed NOUT detected by the output rotation speed sensor 77. The gear ratio calculation unit 84 calculates a gear ratio of the automatic transmission 30 based on the input rotation speed NIN and the output rotation speed NOUT. A gear ratio of the automatic transmission 30 increases as the input rotation speed NIN increases. A gear ratio of the automatic transmission 30 increases as the output rotation speed NOUT reduces. The gear ratio acquisition unit 85 acquires the gear ratio of the automatic transmission 30, calculated by the gear ratio calculation unit 84.

The control apparatus 80 includes a gear ratio determination unit 86. Gear ratios that are respectively determined from the gear stages of the automatic transmission 30 are stored in the gear ratio determination unit 86. The gear ratio determination unit 86 determines a change of the gear ratio of the automatic transmission 30 from a pre-shift gear ratio to an intermediate gear ratio by comparing a gear ratio determined from the gear stage stored in the gear ratio determination unit 86 with a gear ratio acquired by the gear ratio acquisition unit 85. In shift control to change the gear stage of the automatic transmission 30, the gear ratio of the automatic transmission 30, which is determined from a gear stage before change, is a pre-shift gear ratio, and the gear ratio of the automatic transmission 30, which is determined from a gear stage after change, is a post-shift gear ratio. The speed ratio between the pre-shift gear ratio and the post-shift gear ratio is an intermediate gear ratio.

The control apparatus 80 includes an input torque acquisition unit 87. The input torque acquisition unit 87 calculates an input torque TIN input to the input shaft 31 of the automatic transmission 30. The input torque TIN is a torque input from the engine 10 side to the input shaft 31 to attempt to rotate the input shaft 31. The input torque acquisition unit 87 calculates an input torque TIN based on a target engine torque B. The input torque TIN calculated by the input torque acquisition unit 87 increases as the target engine torque B increases.

The control apparatus 80 includes a clutch torque acquisition unit 88. The clutch torque acquisition unit 88 acquires a clutch torque TC of the clutch 33 to be operated when the gear stage of the automatic transmission 30 is changed among the clutches 33 in shift control to change the gear stage of the automatic transmission 30. Here, the clutch torque TC is a maximum transmissive torque of the operated clutch 33 between the input shaft 31 and the output shaft 32. The magnitude of the clutch torque TC increases as a hydraulic pressure supplied to the operated clutch 33 increases. A map that represents the relationship between a magnitude of the clutch torque TC and a hydraulic pressure supplied to the operated clutch 33 is stored in the clutch torque acquisition unit 88. The clutch torque acquisition unit 88 calculates a hydraulic pressure supplied to the operated clutch 33 based on the control signal S2 output to the hydraulic mechanism 50 by the control unit 83. The clutch torque acquisition unit 88 calculates the clutch torque TC of the operated clutch 33 based on the hydraulic pressure supplied to the clutch 33.

The control apparatus 80 includes a torque determination unit 89. The torque determination unit 89 determines a magnitude relation between the input torque TIN and the clutch torque TC. Here, the state in which one of the input torque TIN and the clutch torque TC is greater than the other one of the input torque TIN and the clutch torque TC is defined as a first state, and the state in which the other one of the input torque TIN and the clutch torque TC is greater than the one of the input torque TIN and the clutch torque TC is defined as a second state. The torque determination unit 89 determines a change of the input torque TIN and the clutch torque TC from the first state to the second state.

The control apparatus 80 can be configured as circuitry including one or more processors that execute various processes in accordance with a computer program (software). The control apparatus 80 may be configured as one or more dedicated hardware circuits, such as an application-specific integrated circuit (ASIC), that execute at least part of the various processes, or circuitry including a combination of them. Each processor includes a CPU, and memory, such as RANI and ROM. The memory stores a program code or an instruction configured to cause the CPU to execute a process. The memory, that is, a computer-readable medium, includes any medium accessible by a general-purpose or dedicated computer.

Next, engine torque calculation control that is executed by the control apparatus 80 will be described. The control apparatus 80 repeatedly executes engine torque calculation control from the beginning of the output of a control signal S2 indicating that the automatic transmission 30 is under shift control to the end of the output of the control signal S2.

Figure 2:
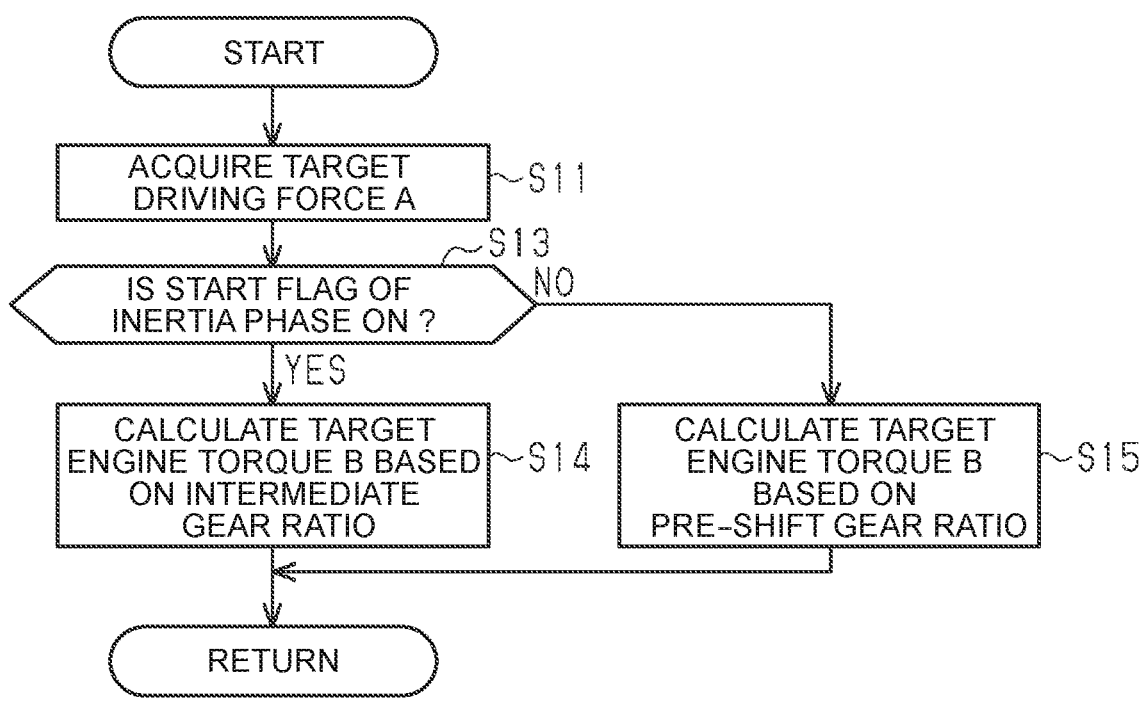
FIG. 2 is a flowchart that shows engine torque calculation control according to the first embodiment.

As shown in FIG. 2, when the control apparatus 80 starts engine torque calculation control, the control apparatus 80 starts the process of step S11. In step S11, the torque calculation unit 82 acquires a target driving force A calculated by the driving force calculation unit 81. After that, the torque calculation unit 82 advances the process to step S13.

In step S13, the torque calculation unit 82, in shift control, determines whether the gear ratio has changed from a pre-shift gear ratio to an intermediate gear ratio, that is, whether a start flag indicating that the inertia phase has started is on. Determination control to determine the start of the inertia phase will be described later. When the torque calculation unit 82 determines that the start flag of the inertia phase is off (NO in S13), the torque calculation unit 82 advances the process to step S15. On the other hand, when the torque calculation unit 82 determines that the start flag of the inertia phase is on (YES in S13), the torque calculation unit 82 advances the process to step S14.

In step S14, the torque calculation unit 82 calculates a target engine torque B based on the target driving force A and the intermediate gear ratio. Here, the gear ratio at the time of the process of step S14, calculated by the gear ratio calculation unit 84, is used as the intermediate gear ratio. The process of step S14 may be regarded as a torque calculation process of calculating a target engine torque B based on an intermediate gear ratio. After that, the current engine torque calculation control is terminated.

On the other hand, when a negative determination is made in step S13, the process proceeds to step S15. In step S15, the torque calculation unit 82 calculates a target engine torque B based on the target driving force A and the pre-shift gear ratio. Here, the gear ratio at the time of the process of step S15, determined from the gear stage of the automatic transmission 30, is used as the pre-shift gear ratio. The gear stage of the automatic transmission 30 is obtained based on the control signal S2 output to the hydraulic mechanism 50 by the control unit 83. After that, the current engine torque calculation control is terminated.

Next, pre-learning determination control to determine the start of the inertia phase, which is executed by the control apparatus 80, will be described. The control apparatus 80 executes pre-learning determination control when the control apparatus 80 begins to output the control signal S2 indicating that the automatic transmission 30 is under shift control. The control apparatus 80 executes once pre-learning determination control in a period from the beginning of the output of the control signal S2 to the end of the output of the control signal S2.

Figure 3:
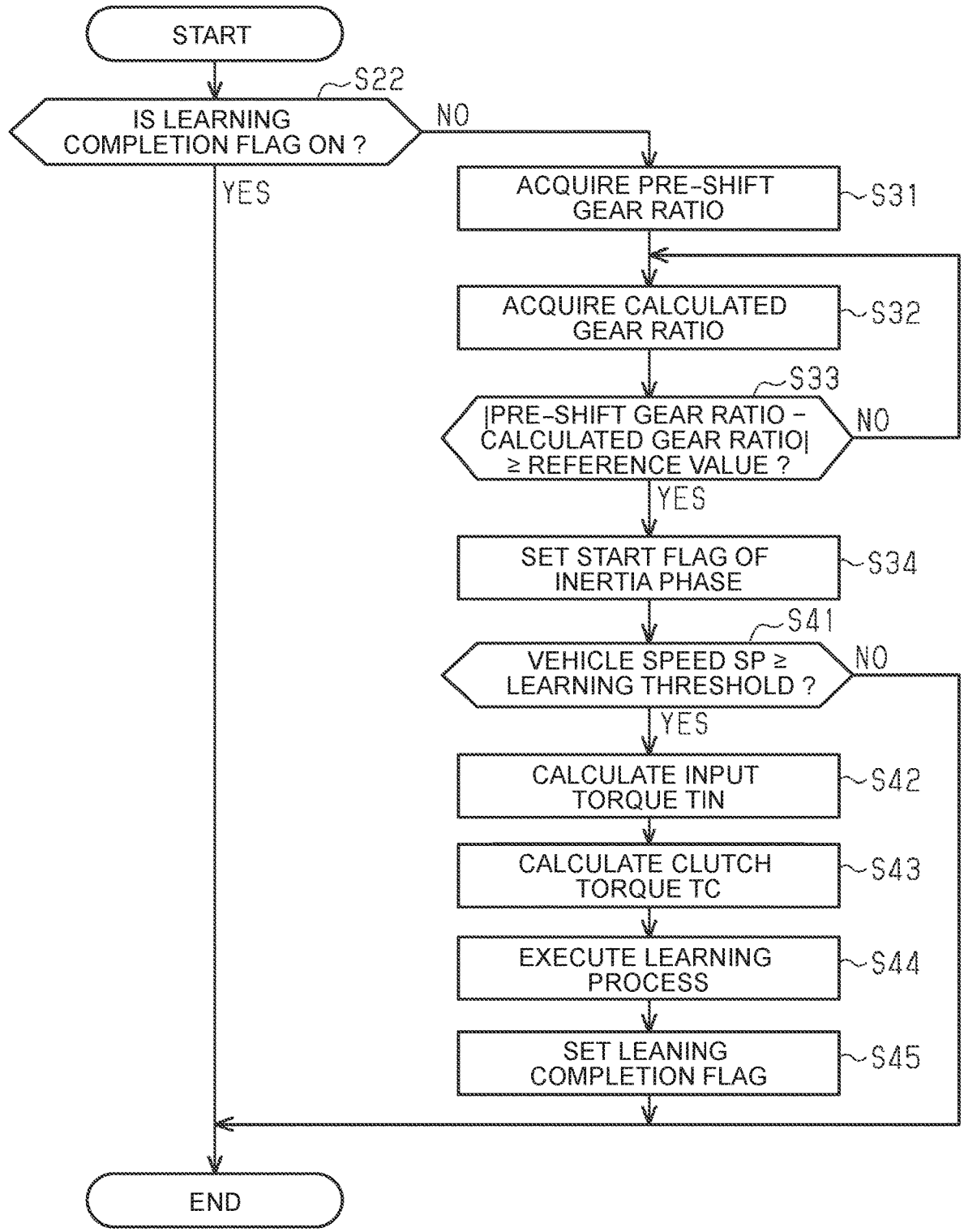
FIG. 3 is a flowchart that shows pre-learning determination control according to the first embodiment.

As shown in FIG. 3, when the control apparatus 80 starts pre-learning determination control, the control apparatus 80 starts the process of step S22. In step S22, the control apparatus 80 determines whether a learning completion flag for the clutch 33 to be operated when the gear stage of the automatic transmission 30 is changed is on. Here, the learning completion flag indicates whether, in step S44 (described later), a learning process for the clutch 33 to be operated when the gear stage of the automatic transmission 30 is changed is complete. The learning completion flag is prepared for each clutch 33 to be operated when the gear stage of the automatic transmission 30 is changed among the clutches 33. The learning completion flag is set when the learning process of step S44 for the associated clutch 33 is complete even once after the vehicle 100 is manufactured. When the vehicle 100 is manufactured, the learning completion flag is off. When the control apparatus 80 determines in step S22 that the learning completion flag for the clutch 33 to be operated when the gear stage of the automatic transmission 30 is changed is on (YES in S22), the control apparatus 80 terminates the current pre-learning determination control. On the other hand, when the control apparatus 80 determines in step S22 that the learning completion flag for the clutch 33 to be operated when the gear stage of the automatic transmission 30 is changed is off (NO in S22), the control apparatus 80 advances the process to step S31.

In step S31, the gear ratio determination unit 86 identifies the gear stage of the automatic transmission 30 before change based on the control signal S2 output to the hydraulic mechanism 50 by the control unit 83. The gear ratio determination unit 86 acquires a pre-shift gear ratio that is determined from the gear stage before change. After that, the gear ratio determination unit 86 advances the process to step S32.

In step S32, the gear ratio determination unit 86 acquires a calculated gear ratio that is the latest gear ratio at the time of the process of step S32 among the gear ratios calculated by the gear ratio calculation unit 84 and acquired by the gear ratio acquisition unit 85. After that, the gear ratio determination unit 86 advances the process to step S33.

In step S33, the gear ratio determination unit 86 calculates a difference between the pre-shift gear ratio acquired in step S31 and the calculated gear ratio calculated by the gear ratio calculation unit 84 and acquired in step S32. The gear ratio determination unit 86 determines whether the difference between the two gear ratios is greater than or equal to a predetermined reference value. When the gear ratio determination unit 86 determines in step S33 that the difference between the two gear ratios is less than the predetermined reference value (NO in S33), the gear ratio determination unit 86 returns the process to step S32. Therefore, when a negative determination is made in step S33, the processes of step S32 and step S33 are repeatedly executed. On the other hand, when the gear ratio determination unit 86 determines in step S33 that the difference between the two gear ratios is greater than or equal to the predetermined reference value (YES in S33), the gear ratio determination unit 86 advances the process to step S34. In other words, when the control apparatus 80 determines that the gear ratio at the time of the process of step S32, calculated by the gear ratio calculation unit 84, deviates from the pre-shift gear ratio determined from the gear stage before change and, as a result, determines that the gear ratio has changed from the pre-shift gear ratio to the intermediate gear ratio, the control apparatus 80 advances the process to step S34. In step S34, the gear ratio determination unit 86 sets the start flag indicating that the inertia phase has started. After that, the gear ratio determination unit 86 advances the process to step S41.

In step S41, the control apparatus 80 determines whether the vehicle speed SP is higher than or equal to a predetermined learning threshold. Here, the learning threshold is determined in advance as a vehicle speed SP that satisfies the following two conditions. The first condition for the learning threshold is that the deviation between an input rotation speed NIN detected by the input rotation speed sensor 76 and an actual input rotation speed NIN is less than a prescribed value. The second condition for the learning threshold is that the deviation between an output rotation speed NOUT detected by the output rotation speed sensor 77 and an actual output rotation speed NOUT is less than a prescribed value. For example, 50 km/h is used as the learning threshold. When the control apparatus 80 determines in step S41 that the vehicle speed SP is lower than the predetermined learning threshold (NO in S41), the control apparatus 80 terminates the current pre-learning determination control. On the other hand, when the control apparatus 80 determines in step S41 that the vehicle speed SP is higher than or equal to the predetermined learning threshold (YES in S41), the control apparatus 80 advances the process to step S42.

In step S42, the input torque acquisition unit 87 calculates an input torque TIN based on the target engine torque B. After that, the input torque acquisition unit 87 advances the process to step S43.

In step S43, the clutch torque acquisition unit 88 calculates the clutch torque TC of the operated clutch 33 based on the control signal S2 output to the hydraulic mechanism 50 by the control unit 83. After that, the clutch torque acquisition unit 88 advances the process to step S44.

In step S44, the clutch torque acquisition unit 88 executes a process of learning the clutch torque TC based on the input torque TIN at the time of the process of step S42 and the clutch torque TC at the time of the process of step S43. Specifically, the clutch torque acquisition unit 88 updates the clutch torque TC such that the difference between the input torque TIN and the clutch torque TC after learning is less than the difference between the input torque TIN and the clutch torque TC before learning. When, for example, the clutch torque TC is greater than the input torque TIN before learning, the clutch torque acquisition unit 88 learns the clutch torque TC such that the clutch torque TC after learning reduces by the predetermined prescribed value. On the other hand, when, for example, the clutch torque TC is less than the input torque TIN before learning, the clutch torque acquisition unit 88 learns the clutch torque TC such that the clutch torque TC after learning increases by the predetermined prescribed value. After that, the clutch torque acquisition unit 88 advances the process to step S45.

In step S45, the clutch torque acquisition unit 88 sets the learning completion flag indicating that the learning process of step S44 is complete for the clutch 33 currently operated when the gear stage of the automatic transmission 30 is changed among the clutches 33. After that, the clutch torque acquisition unit 88 terminates the current pre-learning determination control.

Next, post-learning determination control to determine the start of the inertia phase, which is executed by the control apparatus 80, will be described. The control apparatus 80 executes post-learning determination control when the control apparatus 80 begins to output the control signal S2 indicating that the automatic transmission 30 is under shift control. The control apparatus 80 executes once post-learning determination control in a period from the beginning of the output of the control signal S2 to the end of the output of the control signal S2.

Figure 4:
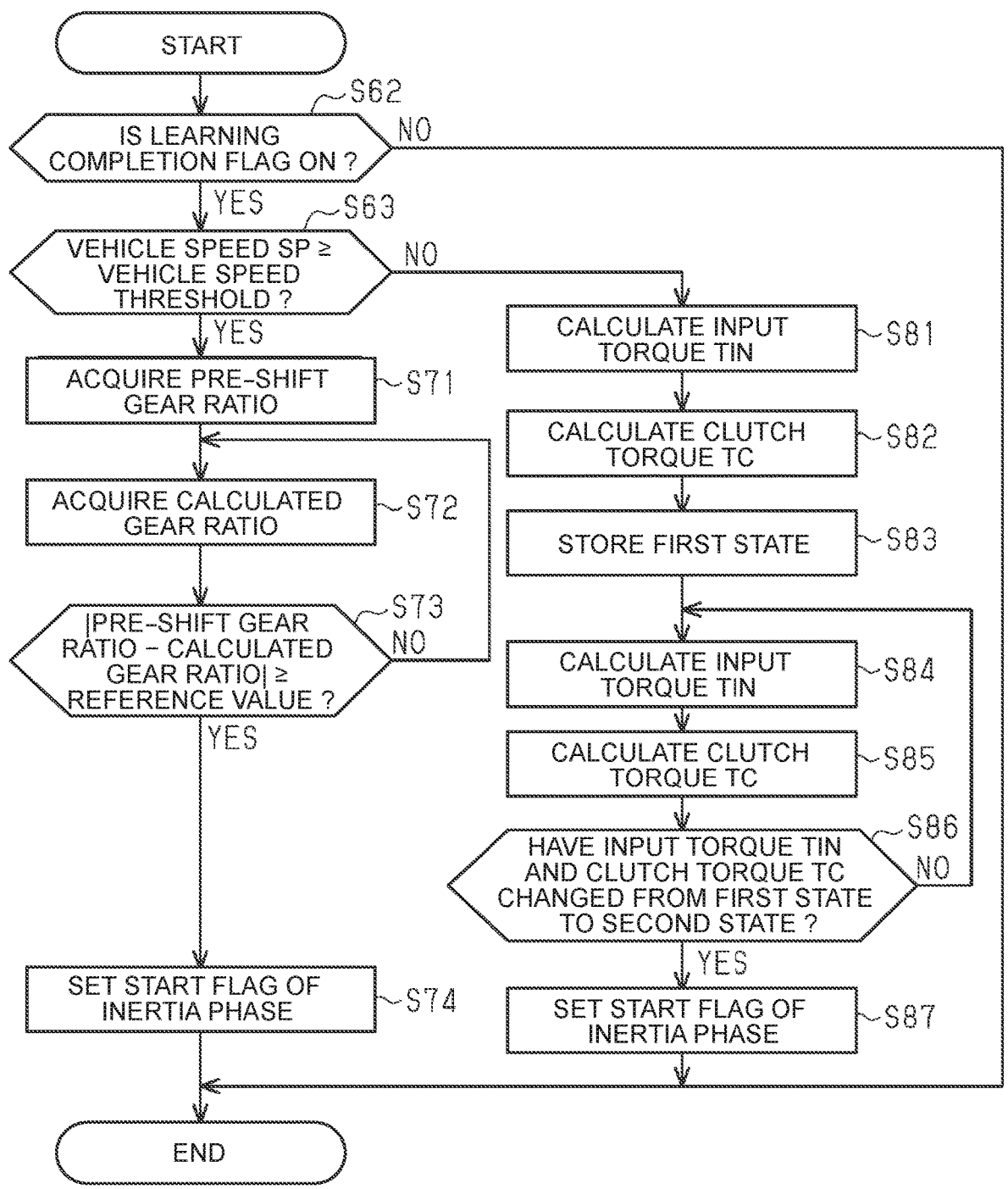
FIG. 4 is a flowchart that shows post-learning determination control according to the first embodiment.

As shown in FIG. 4, when the control apparatus 80 starts post-learning determination control, the control apparatus 80 starts the process of step S62. In step S62, the control apparatus 80 determines whether the learning completion flag for the clutch 33 to be operated when the gear stage of the automatic transmission 30 is changed is on. When the control apparatus 80 determines in step S62 that the learning completion flag for the clutch 33 to be operated when the gear stage of the automatic transmission 30 is changed is off (NO in S62), the control apparatus 80 terminates the current post-learning determination control. On the other hand, when the control apparatus 80 determines in step S62 that the learning completion flag for the clutch 33 to be operated when the gear stage of the automatic transmission 30 is changed is on (YES in S62), the control apparatus 80 advances the process to step S63.

In step S63, the control apparatus 80 determines whether the vehicle speed SP is higher than or equal to a predetermined vehicle speed threshold. Here, the vehicle speed threshold is determined in advance as a vehicle speed SP that satisfies the following two conditions. The first condition for the vehicle speed threshold is that the deviation between an input rotation speed NIN detected by the input rotation speed sensor 76 and an actual input rotation speed NIN is less than a prescribed value. The second condition for the vehicle speed threshold is that the deviation between an output rotation speed NOUT detected by the output rotation speed sensor 77 and an actual output rotation speed NOUT is less than a prescribed value. The same value as the learning threshold, for example, 50 km/h, is set as the vehicle speed threshold. When the control apparatus 80 determines in step S63 that the vehicle speed SP is lower than the predetermined vehicle speed threshold (NO in S63), the control apparatus 80 advances the process to step S81. On the other hand, when the control apparatus 80 determines in step S63 that the vehicle speed SP is higher than or equal to the predetermined vehicle speed threshold (YES in S63), the control apparatus 80 advances the process to step S71.

In step S71, the gear ratio determination unit 86 identifies the gear stage of the automatic transmission 30 before change based on the control signal S2 output to the hydraulic mechanism 50 by the control unit 83. The gear ratio determination unit 86 acquires a pre-shift gear ratio that is determined from the gear stage before change. The process of step S71 is similar to the process of step S31. After that, the gear ratio determination unit 86 advances the process to step S72.

In step S72, the gear ratio determination unit 86 acquires a calculated gear ratio that is the latest gear ratio at the time of the process of step S72 among the gear ratios calculated by the gear ratio calculation unit 84 and acquired by the gear ratio acquisition unit 85. The process of step S72 is similar to the process of step S32. After that, the gear ratio determination unit 86 advances the process to step S73.

In step S73, the gear ratio determination unit 86 calculates a difference between the pre-shift gear ratio acquired in step S71 and the calculated gear ratio calculated by the gear ratio calculation unit 84 and acquired in step S72. The gear ratio determination unit 86 determines whether the difference between the two gear ratios is greater than or equal to a predetermined reference value. The process of step S73 is similar to the process of step S33. When the gear ratio determination unit 86 determines in step S73 that the difference between the two gear ratios is less than the predetermined reference value (NO in S73), the gear ratio determination unit 86 returns the process to step S72. Therefore, when a negative determination is made in step S73, the processes of step S72 and step S73 are repeatedly executed. On the other hand, when the gear ratio determination unit 86 determines in step S73 that the difference between the two gear ratios is greater than or equal to the predetermined reference value (YES in S73), the gear ratio determination unit 86 advances the process to step S74. In other words, when the control apparatus 80 determines that the gear ratio at the time of the process of step S72, calculated by the gear ratio calculation unit 84, deviates from the pre-shift gear ratio determined from the gear stage before change and, as a result, determines that the gear ratio has changed from the pre-shift gear ratio to the intermediate gear ratio, the control apparatus 80 advances the process to step S74. In step S74, the gear ratio determination unit 86 sets the start flag indicating that the inertia phase has started. After that, the gear ratio determination unit 86 terminates the current post-learning determination control.

As described above, when the control apparatus 80 determines in step S63 that the vehicle speed SP is lower than the predetermined vehicle speed threshold (NO in S63), the control apparatus 80 advances the process to step S81.

In step S81, the input torque acquisition unit 87 calculates an input torque TIN based on the target engine torque B. After that, the input torque acquisition unit 87 advances the process to step S82.

In step S82, the clutch torque acquisition unit 88 calculates the clutch torque TC of the operated clutch 33 based on the control signal S2 output to the hydraulic mechanism 50 by the control unit 83. After that, the clutch torque acquisition unit 88 advances the process to step S83.

In step S83, the torque determination unit 89 acquires the input torque TIN at the time of the process of step S81 and the clutch torque TC at the time of the process of step S82. The torque determination unit 89 stores the first state in which one of the input torque TIN and the clutch torque TC is greater than the other one of the input torque TIN and the clutch torque TC, based on the input torque TIN at the time of the process of step S81 and the clutch torque TC at the time of the process of step S82. After that, the torque determination unit 89 advances the process to step S84.

In step S84, the input torque acquisition unit 87 calculates an input torque TIN based on the target engine torque B. After that, the input torque acquisition unit 87 advances the process to step S85.

In step S85, the clutch torque acquisition unit 88 calculates the clutch torque TC of the operated clutch 33 based on the control signal S2 output to the hydraulic mechanism 50 by the control unit 83. After that, the clutch torque acquisition unit 88 advances the process to step S86.

In step S86, the torque determination unit 89 acquires the input torque TIN at the time of the process of step S84 and the clutch torque TC at the time of the process of step S85. The torque determination unit 89 determines whether the input torque TIN and the clutch torque TC are in the second state in which the other one of the input torque TIN and the clutch torque TC is greater than the one of the input torque TIN and the clutch torque TC, based on the input torque TIN at the time of the process of step S84 and the clutch torque TC at the time of the process of step S85.

In shift control, when the magnitude relation between the clutch torque TC and the input torque TIN changes, the inertia phase is started. Specifically, the magnitude relation between the input torque TIN and the clutch torque TC changes as follows in accordance with a change in the accelerator operation amount ACC and the gear ratio.

As a specific example, when the accelerator operation amount ACC becomes greater than zero as a result of operation of the accelerator pedal 61 by the driver and the gear ratio increases in shift control, the gear ratio is changed with a change of the clutch 33, to be operated when the gear stage of the automatic transmission 30 is changed, from the engaged state to the released state. Therefore, before the start of the inertia phase, the clutch torque TC is greater than the input torque TIN. When the clutch torque TC becomes less than the input torque TIN, the inertia phase starts.

When the accelerator operation amount ACC is zero and the gear ratio increases in shift control, the gear ratio is changed with a change of the clutch 33, to be operated when the gear stage of the automatic transmission 30 is changed, from the released state to the engaged state. Therefore, before the start of the inertia phase, the input torque TIN is greater than the clutch torque TC. When the input torque TIN becomes less than the clutch torque TC, the inertia phase starts.

When the accelerator operation amount ACC is greater than zero and the gear ratio reduces in shift control, the gear ratio is changed with a change of the clutch 33, to be operated when the gear stage of the automatic transmission 30 is changed, from the released state to the engaged state. Therefore, before the start of the inertia phase, the input torque TIN is greater than the clutch torque TC. When the input torque TIN becomes less than the clutch torque TC, the inertia phase starts.

When the accelerator operation amount ACC is zero and the gear ratio reduces in shift control, the gear ratio is changed with a change of the operated clutch 33 from the engaged state to the released state. Therefore, before the start of the inertia phase, the clutch torque TC is greater than the input torque TIN. When the clutch torque TC becomes less than the input torque TIN, the inertia phase starts.

In step S86, the torque determination unit 89 determines whether the input torque TIN and the clutch torque TC have changed from the first state to the second state. When the torque determination unit 89 determines in step S86 that the input torque TIN and the clutch torque TC have not changed from the first state to the second state (NO in S86), the torque determination unit 89 returns the process to step S84. Therefore, when a negative determination is made in step S86, the processes of step S84, step S85, and step S86 are repeatedly executed. On the other hand, when the torque determination unit 89 determines in step S86 that the input torque TIN and the clutch torque TC have changed from the first state to the second state (YES in S86), the torque determination unit 89 advances the process to step S87. In step S87, the torque determination unit 89 sets the start flag indicating that the inertia phase has started. After that, the torque determination unit 89 terminates the current post-learning determination control.

The operation of the present embodiment will be described. In shift control, the gear stage is changed as a result of a change of the clutch 33, to be operated when the gear stage of the automatic transmission 30 is changed, from the engaged state to the released state or from the released state to the engaged state. When the input torque TIN and the clutch torque TC change from the first state to the second state, the gear ratio of the automatic transmission 30 changes from the pre-shift gear ratio to the intermediate gear ratio. Therefore, the timing of a change from the pre-shift gear ratio to the intermediate gear ratio, that is, the start timing of the inertia phase, substantially coincides with the timing of a change of the input torque TIN and the clutch torque TC from the first state to the second state. Even when the vehicle speed SP decreases, the accuracy of calculating the input torque TIN with the input torque acquisition unit 87 or the accuracy of calculating the clutch torque TC with the clutch torque acquisition unit 88 does not decrease as compared to those of the input rotation speed NIN and the output rotation speed NOUT. In the control apparatus 80, the start timing of the inertia phase is determined based on a change of the input torque TIN and the clutch torque TC from the first state to the second state, so the determination accuracy is less likely to decrease.

The advantageous effects of the present embodiment will be described.

(1) With the control apparatus 80, it is possible to suppress a decrease in the accuracy of determining the start of the inertia phase. As a result, it is possible to suppress a decrease in the accuracy of calculating a target engine torque B due to the situation in which the start timing of the inertia phase is not appropriately determined.

(2) The accuracy of detecting the input rotation speed NIN with the input rotation speed sensor 76 and the accuracy of detecting the output rotation speed NOUT with the output rotation speed sensor 77 tend to decrease when the vehicle speed SP is lower than the vehicle speed threshold as compared to when the vehicle speed SP is higher than or equal to the vehicle speed threshold. In this regard, in the control apparatus 80, when it is determined that the vehicle speed SP is lower than the predetermined vehicle speed threshold, the start timing of the inertia phase is determined based on a change of the input torque TIN and the clutch torque TC from the first state to the second state. Therefore, in the control apparatus 80, it is possible to appropriately determine the start timing of the inertia phase even when the accuracy of detecting the input rotation speed NIN with the input rotation speed sensor 76 and the accuracy of detecting the output rotation speed NOUT with the output rotation speed sensor 77 tend to decrease.

(3) The accuracy of detecting the input rotation speed NIN with the input rotation speed sensor 76 and the accuracy of detecting the output rotation speed NOUT with the output rotation speed sensor 77 are less likely to decrease when the vehicle speed SP is higher than or equal to the vehicle speed threshold as compared to when the vehicle speed SP is lower than the vehicle speed threshold. In this regard, in the control apparatus 80, when the vehicle speed SP is higher than or equal to the vehicle speed threshold, the gear ratio of the automatic transmission 30 is calculated based on the input rotation speed NIN detected by the input rotation speed sensor 76 and the output rotation speed NOUT detected by the output rotation speed sensor 77. When the control apparatus 80 determines that the gear ratio calculated from the input rotation speed NIN and the output rotation speed NOUT has changed from the pre-shift gear ratio to the intermediate gear ratio, the control apparatus 80 determines the start timing of the inertia phase. Therefore, in the control apparatus 80, it is possible to determine the start timing of the inertia phase when the accuracy of detecting the input rotation speed NIN with the input rotation speed sensor 76 and the accuracy of detecting the output rotation speed NOUT with the output rotation speed sensor 77 are less likely to decrease.

(4) In the vehicle 100, depending on a manufacturing error or the like of the automatic transmission 30, there may occur a deviation between the actual start timing of the inertia phase and the determined start timing of the inertia phase based on a change of the input torque TIN and the clutch torque TC from the first state to the second state. In this regard, in the control apparatus 80, when the vehicle speed SP is higher than or equal to the learning threshold and the start of the inertia phase is determined based on the input rotation speed NIN and the output rotation speed NOUT, the learning process is executed to reduce the difference between the input torque TIN and the clutch torque TC. Thus, it is possible to suppress occurrence of a deviation between the actual start timing of the inertia phase and the determined start timing of the inertia phase based on a change of the input torque TIN and the clutch torque TC from the first state to the second state.

(5) In the control apparatus 80, the target engine torque B is calculated by using the clutch torque TC of the clutch torque acquisition unit 88, on which the learning process is complete. As described above, it is possible to suppress occurrence of a deviation between the actual start timing of the inertia phase and the determined start timing of the inertia phase based on a change of the input torque TIN and the clutch torque TC from the first state to the second state. Therefore, it is possible to appropriately calculate the target engine torque B for a change from the pre-shift gear ratio to the intermediate gear ratio.

Second Embodiment

Hereinafter, a second embodiment will be described with reference to FIG. 5. In the second embodiment, part of the processes of step S81, step S82, step S83, step S84, step S85, step S86, and step S87 in post-learning determination control that is executed by the control apparatus 80 are different. In the description of the second embodiment, differences from the first embodiment will be mainly described, like reference signs are assigned to components similar to those of the first embodiment, and the detailed description thereof is omitted or simplified.

Figure 5:
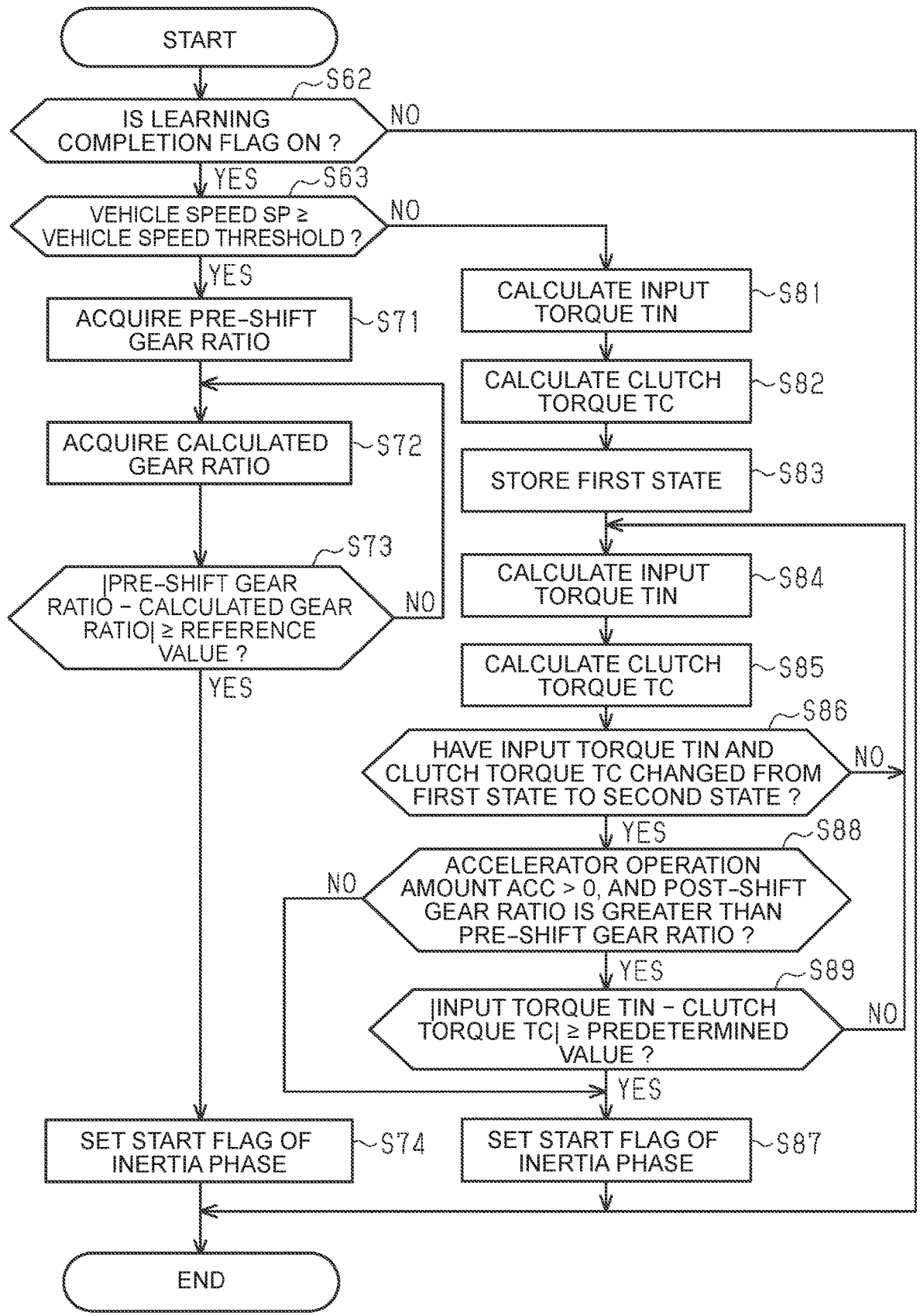
FIG. 5 is a flowchart that shows post-learning determination control according to a second embodiment.

As shown in FIG. 5, in step S81, the input torque acquisition unit 87 calculates an input torque TIN based on the target engine torque B. After that, the input torque acquisition unit 87 advances the process to step S82.

In step S82, the clutch torque acquisition unit 88 calculates the clutch torque TC of the operated clutch 33 based on the control signal S2 output to the hydraulic mechanism 50 by the control unit 83. After that, the clutch torque acquisition unit 88 advances the process to step S83.

In step S83, the torque determination unit 89 acquires the input torque TIN at the time of the process of step S81 and the clutch torque TC at the time of the process of step S82. The torque determination unit 89 stores the first state in which one of the input torque TIN and the clutch torque TC is greater than the other one of the input torque TIN and the clutch torque TC, based on the input torque TIN at the time of the process of step S81 and the clutch torque TC at the time of the process of step S82. After that, the torque determination unit 89 advances the process to step S84.

In step S84, the input torque acquisition unit 87 calculates an input torque TIN based on the target engine torque B. After that, the input torque acquisition unit 87 advances the process to step S85.

In step S85, the clutch torque acquisition unit 88 calculates the clutch torque TC of the operated clutch 33 based on the control signal S2 output to the hydraulic mechanism 50 by the control unit 83. After that, the clutch torque acquisition unit 88 advances the process to step S86.

In step S86, the torque determination unit 89 acquires the input torque TIN at the time of the process of step S84 and the clutch torque TC at the time of the process of step S85. The torque determination unit 89 determines whether the input torque TIN and the clutch torque TC have changed from the first state to the second state based on the input torque TIN at the time of the process of step S84 and the clutch torque TC at the time of the process of step S85. When the torque determination unit 89 determines in step S86 that the input torque TIN and the clutch torque TC have not changed from the first state to the second state (NO in S86), the torque determination unit 89 returns the process to step S84. On the other hand, when the torque determination unit 89 determines in step S86 that the input torque TIN and the clutch torque TC have changed from the first state to the second state (YES in S86), the torque determination unit 89 advances the process to step S88.

In step S88, the control apparatus 80 determines whether the following two conditions are satisfied.

Condition (1): The accelerator operation amount ACC is greater than zero.

Condition (2): The post-shift gear ratio is greater than the pre-shift gear ratio.

When the control apparatus 80 determines in step S88 that Condition (1) or Condition (2) is not satisfied (NO in S88), the control apparatus 80 advances the process to step S87. On the other hand, when the control apparatus 80 determines in step S88 that Condition (1) and Condition (2) both are satisfied (YES in S88), the control apparatus 80 advances the process to step S89.

In step S89, the torque determination unit 89 calculates a difference between the input torque TIN at the time of the process of step S84 and the clutch torque TC at the time of the process of step S85. The torque determination unit 89 determines whether the difference between the input torque TIN and the clutch torque TC is greater than or equal to a predetermined value. When the torque determination unit 89 determines in step S89 that the difference between the input torque TIN and the clutch torque TC is less than the predetermined value (NO in S89), the torque determination unit 89 returns the process to step S84. On the other hand, when the torque determination unit 89 determines in step S89 that the difference between the input torque TIN and the clutch torque TC is greater than or equal to the predetermined value (YES in S89), the torque determination unit 89 advances the process to step S87. In step S87, the torque determination unit 89 sets the start flag indicating that the inertia phase has started. After that, the torque determination unit 89 terminates the current post-learning determination control.

The operation of the present embodiment will be described. When the accelerator operation amount ACC is greater than zero as a result of operation of the accelerator pedal 61 by the driver and the post-shift gear ratio is greater than the pre-shift gear ratio in shift control, it is highly likely that steep acceleration of the vehicle 100 is required. Here, when it is assumed that the target driving force A of the vehicle is maintained at a constant value, after the gear ratio of the automatic transmission 30 changes from the pre-shift gear ratio to the intermediate gear ratio, the calculated target engine torque B reduces with an increase in gear ratio as compared to before the gear ratio changes. If it is determined that the inertia phase has started although before the gear ratio of the automatic transmission 30 changes from the pre-shift gear ratio to the intermediate gear ratio, the target engine torque B reduces when the actual gear ratio of the automatic transmission 30 is the pre-shift gear ratio. As a result, an actual driving force of the vehicle 100 becomes smaller than the target driving force A, so the acceleration performance of the vehicle 100 deteriorates.

In this regard, in the control apparatus 80, when the torque determination unit 89 determines that the input torque TIN and the clutch torque TC have changed from the first state to the second state and then the difference between the input torque TIN and the clutch torque TC becomes greater than or equal to the predetermined value, it is determined that the inertia phase has started. Thus, in the control apparatus 80, it is possible to suppress a situation in which the inertia phase has started although before the start of the inertia phase.

The advantageous effects of the present embodiment will be described. In the present embodiment, in addition to the advantageous effects of the above (1) to (5), the advantageous effect of the following (6) is obtained.

(6) In the control apparatus 80, a situation in which the target engine torque B is calculated based on the intermediate gear ratio although before the start of the inertia phase is less likely to occur. As a result, it is possible to suppress deterioration of the acceleration performance of the vehicle 100 when acceleration of the vehicle 100 is required.

The present embodiment may be modified as follows. The present embodiment and the following modifications may be implemented in combination with each other without any technical contradiction.

In the above-described first embodiment and second embodiment, the process of learning the clutch torque TC may be changed. For example, the learning threshold may be set as needed. The learning threshold may be the same as the vehicle speed threshold or may be different from the vehicle speed threshold. In terms of improving the accuracy of learning the clutch torque TC, it is desirable that the learning threshold be large as compared to when the learning threshold is small. The learning completion flag may be set when, for example, the learning process of step S44 has completed multiple times.

In the above-described first embodiment and second embodiment, the process of learning the clutch torque TC may be omitted. Specifically, pre-learning determination control may be omitted. The determination process of step S62 in post-learning determination control may be omitted.

In the above-described first embodiment and second embodiment, the vehicle speed threshold may be changed as needed. The decreasing tendency of the detection accuracy of the input rotation speed sensor 76 varies depending on, for example, the type of the input rotation speed sensor 76. Therefore, the vehicle speed threshold just needs to be set for the input rotation speed sensor 76 to be employed. This also applies to the output rotation speed sensor 77.

In the above-described first embodiment and second embodiment, a comparison determination between the vehicle speed SP and the vehicle speed threshold may be omitted. In this case, regardless of the vehicle speed SP, the start timing of the inertia phase may be determined based on a change of the input torque TIN and the clutch torque TC from the first state to the second state. With this configuration, the start of the inertia phase does not need to be determined based on the input rotation speed NIN detected by the input rotation speed sensor 76 and the output rotation speed NOUT detected by the output rotation speed sensor 77.

In the above-described second embodiment, the determination process of step S89 may be modified. For example, in step S89, the torque determination unit 89 calculates a ratio between the input torque TIN at the time of the process of step S84 and the clutch torque TC at the time of the process of step S85. The torque determination unit 89 may determine whether the ratio between the input torque TIN and the clutch torque TC is greater than or equal to a predetermined value. In this case as well, in step S89, it is possible to determine whether there is a deviation greater than or equal to the predetermined value between the input torque TIN and the clutch torque TC.

In the above-described first embodiment and second embodiment, from the viewpoint of determining the start of the inertia phase by the control apparatus 80, the control apparatus 80 does not need to include the gear ratio calculation unit 84 or the torque calculation unit 82. In this case, when a control apparatus different from the control apparatus 80 includes the gear ratio calculation unit 84 and the torque calculation unit 82, it is possible to calculate a target engine torque B.

A technical idea that can be understood from the above-described embodiments and modifications will be described.

A control apparatus that is applied to a vehicle including an engine and a step automatic transmission includes an input torque acquisition unit configured to acquire an input torque input to an input shaft of the automatic transmission, a clutch torque acquisition unit configured to acquire a clutch torque that is a maximum transmissive torque of a clutch to be operated when a gear stage of the automatic transmission is changed, and a torque determination unit configured to, where a state in which one of the input torque and the clutch torque is greater than the other one of the input torque and the clutch torque is a first state and a state in which the other one of the input torque and the clutch torque is greater than the one of the input torque and the clutch torque is a second state, determine a change of the input torque and the clutch torque from the first state to the second state.

What is claimed is:

1. A control apparatus that is applied to a vehicle including an engine and a step automatic transmission, the control apparatus comprising:
    an input torque acquisition unit configured to acquire an input torque to be input to an input shaft of the automatic transmission;
    a clutch torque acquisition unit configured to acquire a clutch torque that is a maximum transmissive torque of a clutch to be operated when a gear stage of the automatic transmission is changed;
    a torque determination unit configured to, where a state in which one of the input torque and the clutch torque is greater than the other one of the input torque and the clutch torque is a first state and a state in which the other one of the input torque and the clutch torque is greater than the one of the input torque and the clutch torque is a second state, determine a change of the input torque and the clutch torque from the first state to the second state;
    a gear ratio calculation unit configured to calculate an intermediate gear ratio that is a gear ratio between a pre-shift gear ratio and a post-shift gear ratio, the pre-shift gear ratio being a gear ratio of the automatic transmission, which is determined from a gear stage before change, the post-shift gear ratio being a gear ratio of the automatic transmission, which is determined from a gear stage after change; and
    a torque calculation unit configured to, on condition that the torque determination unit determines a change of the input torque and the clutch torque from the first state to the second state, execute a torque calculation process that is a process of calculating a target engine torque of the engine based on the intermediate gear ratio calculated by the gear ratio calculation unit.

2. The control apparatus according to claim 1, wherein the torque calculation unit is configured to execute the torque calculation process on condition that a speed of the vehicle is lower than a predetermined vehicle speed threshold and the torque determination unit determines a change of the input torque and the clutch torque from the first state to the second state.

3. The control apparatus according to claim 2, wherein:
    the vehicle further includes
        an input rotation speed sensor configured to detect a rotation speed of the input shaft, and
        an output rotation speed sensor configured to detect a rotation speed of an output shaft of the automatic transmission;
    the control apparatus further comprises:
        a gear ratio acquisition unit configured to acquire a gear ratio of the automatic transmission based on the rotation speed of the input shaft, detected by the input rotation speed sensor, and the rotation speed of the output shaft, detected by the output rotation speed sensor; and
        a gear ratio determination unit configured to determine a change of the gear ratio of the automatic transmission, acquired by the gear ratio acquisition unit, from the pre-shift gear ratio to the intermediate gear ratio; and
    the torque calculation unit is configured to execute the torque calculation process on condition that the speed of the vehicle is higher than or equal to the vehicle speed threshold and the gear ratio determination unit determines a change of the gear ratio of the automatic transmission, acquired by the gear ratio acquisition unit, from the pre-shift gear ratio to the intermediate gear ratio.

4. The control apparatus according to claim 3, wherein the clutch torque acquisition unit is configured to, when the speed of the vehicle is higher than or equal to a predetermined learning threshold and the gear ratio determination unit determines a change of the gear ratio of the automatic transmission, acquired by the gear ratio acquisition unit, from the pre-shift gear ratio to the intermediate gear ratio, execute a learning process that is a process of updating the clutch torque such that a difference between the clutch torque and the input torque acquired by the input torque acquisition unit reduces.

5. The control apparatus according to claim 4, wherein the torque calculation unit is configured to execute the torque calculation process on condition that the speed of the vehicle is lower than the predetermined vehicle speed threshold, the torque determination unit determines a change of the input torque and the clutch torque from the first state to the second state, and the learning process has been executed.

6. The control apparatus according to claim 1, wherein:
    the first state is a state in which the clutch torque is greater than the input torque;
    the second state is a state in which the clutch torque is less than the input torque; and
    the torque calculation unit is configured to, when an accelerator member of the vehicle is being operated and the post-shift gear ratio is higher than the pre-shift gear ratio, execute the torque calculation process on condition that there occurs a deviation greater than or equal to a predetermined value between the input torque and the clutch torque after the torque determination unit determines a change of the input torque and the clutch torque from the first state to the second state.

* * * * *